United States Patent [19]

Beeson

[11] 4,063,904

[45] Dec. 20, 1977

[54] SELF-CONTAINED FIRE PACKAGE

[76] Inventor: Frank C. Beeson, P.O. Box 5534, Eugene, Oreg. 97405

[21] Appl. No.: 632,967

[22] Filed: Nov. 18, 1975

[51] Int. Cl.² .............................................. C10L 11/00
[52] U.S. Cl. ........................................... 44/40; 44/38
[58] Field of Search ...................................... 44/40, 38

[56] References Cited

U.S. PATENT DOCUMENTS

| 200,972 | 3/1878 | Boote et al. | 44/40 |
|---------|--------|--------------|-------|
| 286,103 | 10/1883 | Wood et al. | 44/40 |
| 739,131 | 9/1903 | Adler | 44/40 |
| 1,401,803 | 12/1921 | Lynes | 44/40 |

FOREIGN PATENT DOCUMENTS 556,791  5/1958  Canada ...................................... 44/40

Primary Examiner—Carl F. Dees
Attorney, Agent, or Firm—Kolisch, Hartwell, Dickinson & Stuart

[57] ABSTRACT

A self-contained fire package including a container in which fuel elements, such as pieces of wood, are arranged in a special manner to produce controlled, long-time burning of the package. A first plurality of such elements are arranged in stacks extending, as viewed from above, in a generally U-shaped configuration along the back and lateral sides of the container to form a forwardly facing pocket. Tinder material, such as excelsior, along with a second plurality of fuel elements, such as small wood blocks are distributed at random in this pocket. Two swing-out flaps are formed, as by die cutting, in the container, one being directly over, and the other being directly in front of, the pocket. The one in front accommodates insertion of a match or the like to ignite the package. The one over the pocket swings out to form a draft flue.

9 Claims, 2 Drawing Figures

SELF-CONTAINED FIRE PACKAGE

BACKGROUND AND SUMMARY OF THE INVENTION

This invention pertains to a self-contained fire package of the type which might be used within a fireplace, or at the location of a camp site, to create a fire.

With the increasing difficulty and cost today of acquiring natural fire wood, a variety of products, usually made of of wood waste materials, with combustible additives in some instances, have entered the market, and are now readily available as substitutes. While these substitute products do indeed function as fuel elements for a fire, they all have some drawbacks which limit their appeal.

For example, products, such as compressed wood waste, which include a combustible additive, such as a petroleum additive, are often objected to because of unpleasant odors which they give off when burning, and further because of residues which are sometimes left after burning and which are difficult to clean and remove from fire grates and the like. Other products have been found to burn extremely rapidly and require, therefore, substantial amounts of fuel even for relatively short burning times. Still a further objection is that most of these products do not crackle and flame in the manner usually associated with a fire generated by natural fire wood.

A general object of the present invention is to provide a novel self-contained fire package in which a collection of fuel elements, such as pieces of wood, are arranged in a special manner to produce controlled long-time burning of the package, with the resultant fire crackling and flaming in substantially the same manner as a fire produced by natural fire wood.

According to a preferred embodiment of the invention, a burnable container is provided, such as a conventional corrugated cardboard box, in which the fuel elements mentioned are distributed. In particular, a first stack of such elements, such as elongated pieces of 2 × 4 lumber, extends substantially completely along the back of the container from one lateral side thereof to the other. This stack extends vertically substantially completely between the bottom and top of the container. Two other stacks of pieces, such as pieces of 2 × 4 lumber, extend forwardly from this first-mentioned stack, along the lateral sides of the container toward its front. As viewed from above, these three stacks form a generally U-shaped configuration defining a forwardly facing pocket in the container.

Distributed at random within this pocket are tinder materials, such as excelsior, etc., and a plurality of fuel elements somewhat smaller than those used in the stacks, such as small blocks of wood.

As presented to a user, the container in the proposed package is completely sealed. Two flaps are formed in the container as by die cutting, one of these being swingable upwardly from the top of the container to form a flue over the pocket therein, and the other being swingable downwardly and forwardly from the front of the container to expose the tinder in the pocket for ignition by a match or the like.

When the package of the invention is lighted, it engages, throughout its burning life so-to-speak, in what might be thought of as three stages of combustion. The first stage involves consuming of the tinder and fuel elements within the pocket mentioned above. Also, during this stage, much of the front and top of the container burn away. The second stage of combustion results largely in the consumption of the two lateral stacks of elements which extend along the opposite sides of the container. As these elements burn, they topple inwardly toward the area of the pocket. The third stage results in consumption of the elements forming the rear stack which is distributed along the back of the container.

By way of illustration, packages have been made and tested which are generally rectangular and include cartons measuring about 8 inches high, about 12 inches deep, and about 16 inches long. The long dimension of the package forms the front and back sides thereof. Fuel elements, such as the wood pieces mentioned above, used in this size package, and arranged as described generally above, have been found to produce a very naturally crackling hot fire, lasting for as much as about three hours. Apart from initially swinging out the flaps mentioned, and igniting the package, a user need pay no further attention to the package through its burning life.

These and other objects and advantages which are attained by the invention will become more fully apparent as the description which now follows is read in conjunction with the accompanying drawings.

DETAILED DESCRIPTION OF THE INVENTION

Figure 1:
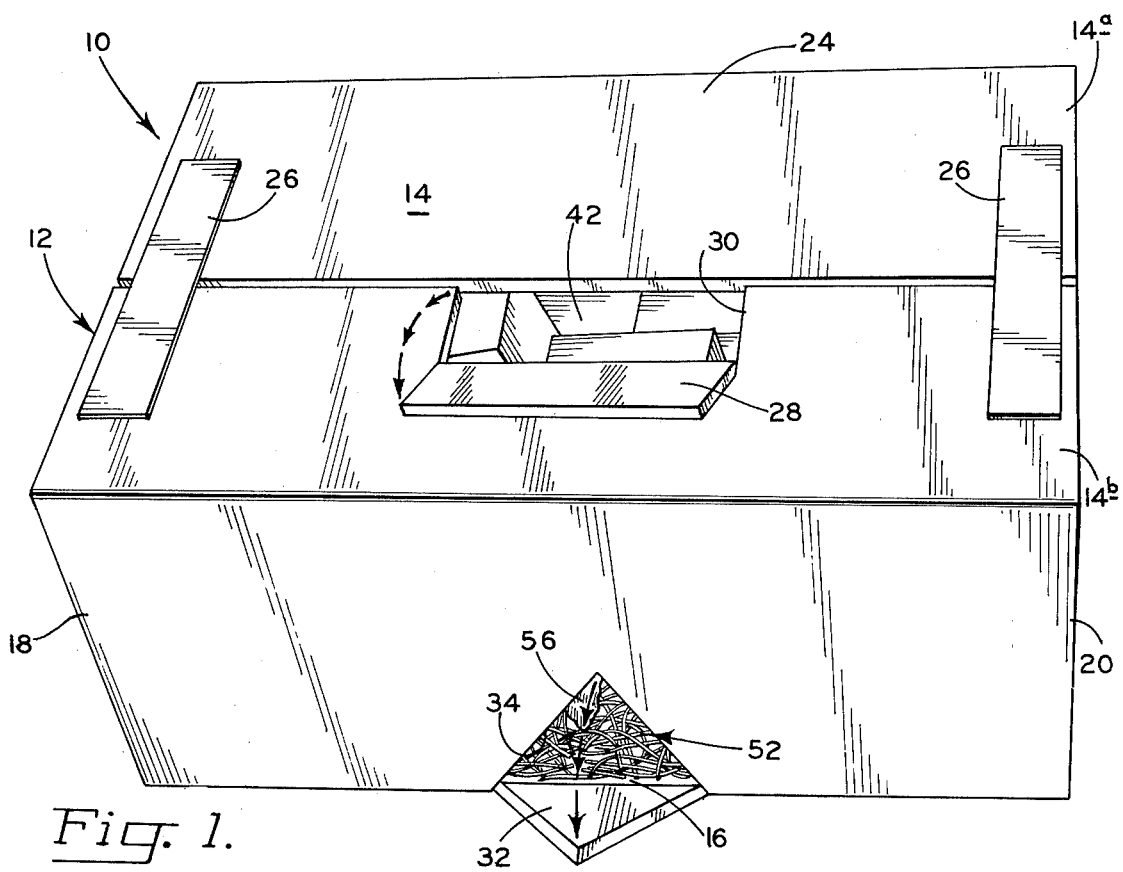
FIG. 1 is a front top perspective view illustrating a fire package constructed in accordance with the invention.

Turning now to the drawings, indicated generally at 10 is a self-contained fire package constructed in accordance with the present invention. The outer portion of package 10 herein takes the form of a conventional corrugated cardboard carton, or container, 12 having the usual top and bottom 14, 16, respectively, lateral sides 18, 20, and front and rear sides 22, 24, respectively. The top and bottom of the carton are formed in the usual manner by two coplanar folded panels, such as the two panels shown at 14a, 14b for top 14. In package 10, pieces of packing tape such as those shown at 26 are used to secure the top panels in place.

Formed as by die cutting in top panel 14b is a generally rectangular swing-out flap 28. In FIG. 1, this flap is shown swung upwardly and outwardly to create an opening 30 in the top. Similarly, formed in front side 22 of the carton is a generally triangular swing-out flap 32, which is shown in FIG. 1 swung outwardly and downwardly to expose an opening 34 in the front of the carton. The purposes for these flaps and openings will be more fully explained shortly. It should be understood that when package 10 is initially received by a user, flaps 28, 32 are not in their swung-out positions as shown, but rather occupy the planes of their respective associated sides of the carton where they close openings 30, 34.

Distributed within carton 12, in accordance with the invention, are fuel elements arranged in three stacks shown at 36, 38, 40, and also deposited at random as shown generally at 42. In the three stacks mentioned, the fuel elements which are used in the particular embodiment of the invention which is now being described are lengths of conventional 2 × 4 lumber. In particular, stack 36 includes four such lengths of lumber, such as those shown at 44. Stack 38 includes four somewhat shorter lengths of lumber, such as those shown at 46. Similarly, stack 40 includes lengths of 2 × 4 lumber 48 which are substantially the same length as pieces 46.

It will be noted that the three mentioned stacks of lumber pieces, as viewed from above, form a generally U-shaped configuration extending around and along the lateral and back sides of carton 12. This is considered to be an important feature of the proposed fuel element arrangement according to the invention. Another feature is that lumber pieces 44 extend substantially completely along the length of the back of the carton, with lumber pieces 46, 48 extending forwardly along the lateral sides of the carton from the front edge of stack 36. The U-shaped configuration of the three stacks defines what is referred to herein as a forwardly facing pocket 50 which, it can be seen, receives previously mentioned fuel elements 42.

Elements 42 herein comprise blocks of wood which are somewhat smaller than the pieces of wood used in the three stacks.

Figure 2:
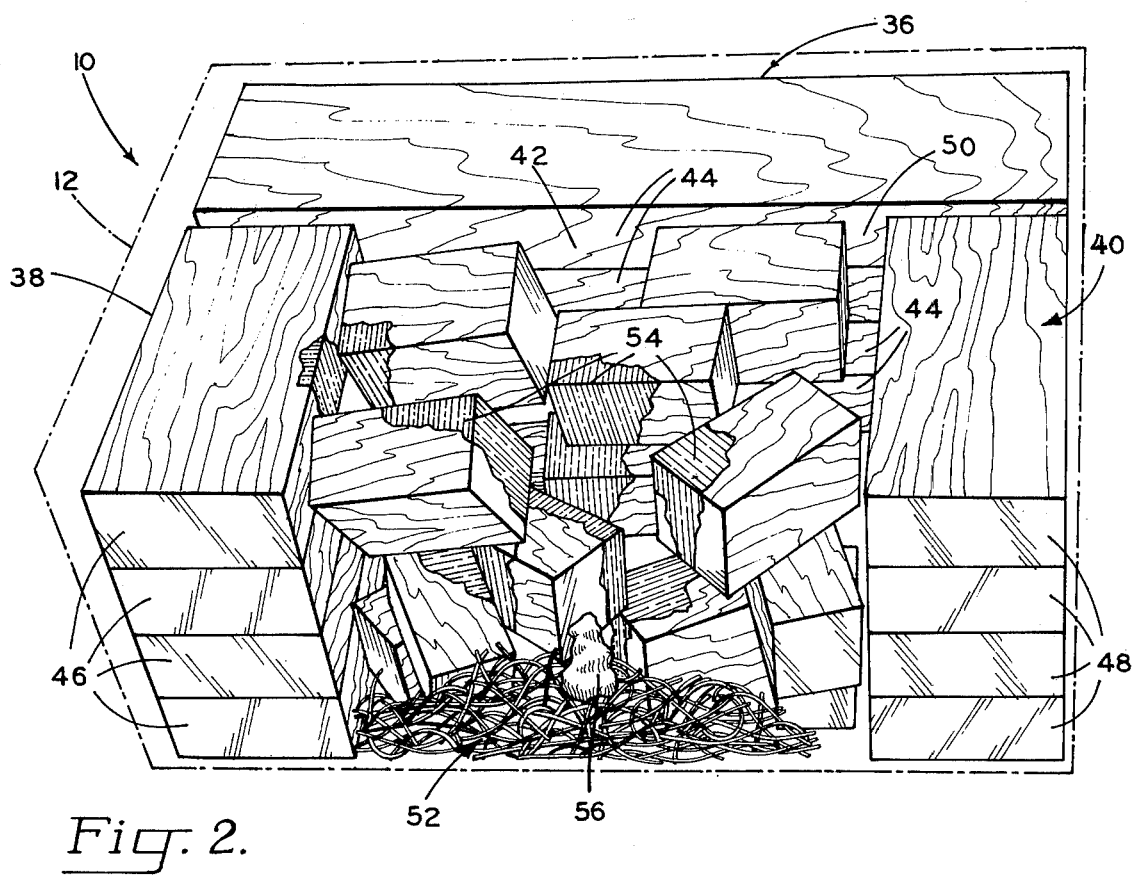
FIG. 2 is a view similar to FIG. 1 but differing in that an outer container in the package is shown only in dash-dot outline so as to reveal the arrangement of fuel elements in the package.

Also provided within pocket 50, preferably toward the front side of the pocket, are wood shavings or excelsior, also referred to as tinder means, shown at 52. Although it is not necessary to the invention, the embodiment thereof which is now being described further includes a random deposition of wax, such as oridinary candle wax, this being shown by the shaded areas indicated generally at 54 in FIG. 2. Further, there is included in pocket 50 a lump of wax shown at 56.

As has previously been mentioned, when package 10 is initially received by a user, flaps 28, 32 are closed. To use the package, the user simply places the package in his fireplace, or wherever he intends to create a fire, opens flaps 28, 32, and ignites the package by inserting a match or the like through opening 34 to ignite shavings 52. Opening 30 which is exposed by swinging of flap 28 creates a draft flue allowing rapid starting of a fire.

Tests performed on a number of packages like package 10 have shown that the randomly distributed wood blocks in pocket 50 ignite quite rapidly, and are consumed during what might be thought of as a first stage of burning in the package. Also, a large portion of top 14 and front 22 of the carton burn away during this stage.

Naturally, while the contents of pocket 50 are burning, there is some combustion of the faces of stacks 36, 38 40 which are exposed to the pocket. Nevertheless, observation has shown that after the first burning stage just discussed, there is what might be thought of as a second burning phase which results in the consumption of lumber pieces 46, 48 in stacks 38, 40, respectively. It has been observed, for example, that as these pieces burn, they topple generally into the area previously occupied by blocks 42.

Finally, there has been observed what might be referred to as a third burning stage which results in the consumption of the wood pieces in stack 36.

There is thus proposed by the instant invention a unique self-contained fire package wherein a novel arrangement of fuel elements enables a highly pleasing and long-lasting, quite natural fire. A package of the size mentioned above has been found to be capable of burning for a period of up to about 3 hours. With wood pieces used as described for the fuel elements, a fire results which is very much like that produced by natural fire wood. In other words, the fire exhibits a healthy blaze with natural crackling activity. Because of the way in which the fuel elements are arranged in the package according to the invention, a long-lasting self-fueling fire is produced.

Further, it will be observed that, as it is presented to a user, the proposed fire package is extremely simple to handle, and easy and convenient to store.

Naturally, different kinds of fuel elements can be used if desired, and an overall package size may vary to suit the particular need.

Therefore, while a preferred embodiment of the invention has been described, it is appreciated that variations and modifications may be made without departing from the spirit of the invention.

What is claimed and desired to secure by letters patent is:

1. A self-contained fire package comprising:
   means defining an enclosed space for containing fuel; and
   fuel means disposed within said space including
   a first plurality of fuel elements which are stacked, with the stacks thereof arranged in a generally U-shaped configuration so as to form a pocket partially bounded by the stacks, and
   a second plurality of fuel elements, smaller than the elements in said first plurality of fuel elements, distributed at random within said pocket.

2. The package of claim 1 which further includes first opening-enabling means formed in said means defining said enclosed space for enabling the selected creation in the latter of an opening over and exposing at least a portion of the top of said pocket, and second opening-enabling means also formed in said means defining said enclosed space enabling the selected creation in the latter of an opening in front of and at least partially exposing the front of said pocket.

3. The package of claim 1 which further includes tinder means distributed within said pocket adjacent said second plurality of fuel elements.

4. The package of claim 3 which further includes first opening-enabling means formed in said means defining said enclosed space for enabling the selected creation in the latter of an opening over and exposing at least a portion of the top of said pocket, and second opening-enabling means also formed in said means defining said enclosed space enabling the selected creation in the latter of an opening in front of and at least partially exposing the front of said pocket.

5. The package of claim 1, wherein said means defining said enclosed space includes front, back and lateral sides, and said first plurality of fuel elements includes a first set of elongated elements arranged in a stack which extends substantially completely along said back side, and second and third sets of elongated elements arranged in two stacks which extend respectively along said lateral sides from immediately in front of said stack of said first set of elements toward said front side.

6. A self-contained fire package comprising
   a burnable fuel enclosure having a top, a bottom, and four sides, including front, back and lateral sides, forming a continuous web joining said top and bottom,
   a first plurality of fuel elements stacked within said enclosure in the form of a generally U-shaped configuration, said configuration including branches extending along said back and lateral sides defining a pocket facing said front side, with the stacked elements extending vertically substantially fully between said top and bottom, a second plurality of fuel elements, smaller than those in said first plurality of fuel elements, distributed at random within said pocket, first opening-enabling means formed in said top of said enclosure enabling the selective creation therein of an opening over and exposing at least a portion of the top of said pocket, and second opening-enabling means formed in front side of said enclosure enabling the selective creation therein of an opening in front of and at least partially exposing the front of said pocket.

7. The package of claim 6 which further includes tinder means distributed within said pocket adjacent said second plurality of fuel elements.

8. The package of claim 6, wherein said first plurality of fuel elements includes a first set of elongated elements arranged in a stack which extends substantially completely along said back side, and second and third sets of elongated elements arranged in two stacks which extend respectively along said lateral sides from immediately in front of said stack of said first set of elements toward said front side.

9. A self-contained fire package comprising:

a burnable fuel enclosure having a top, a bottom, and four sides, including front, back and lateral sides, forming a continuous web joining said top and bottom;

a first plurality of fuel elements stacked within said enclosure in the form of a generally U-shaped configuration, said configuration including branches extending along said back and lateral sides defining a pocket facing said front side, with the stacked elements extending vertically substantially fully between said top and bottom;

a second plurality of fuel elements, smaller than those in said first plurality of fuel elements, distributed at random within said pocket; and means in said enclosure for accommodating a draft through said pocket toward said front side of said enclosure comprising first opening-enabling means formed in said top of said enclosure enabling the selective creation therein of an opening over and exposing at least a portion of the top front side of said pocket, and second opening-enabling means formed in said front side of said enclosure enabling the selective creation therein of an opening in front of and at least partially exposing the front of said pocket.

* * * * *